July 13, 1943.   L. F. CARTER   2,323,897
FLIGHT INDICATOR
Filed Sept. 28, 1940   2 Sheets-Sheet 1

INVENTOR
LESLIE F. CARTER
BY
Herbert H. Thompson
his ATTORNEY.

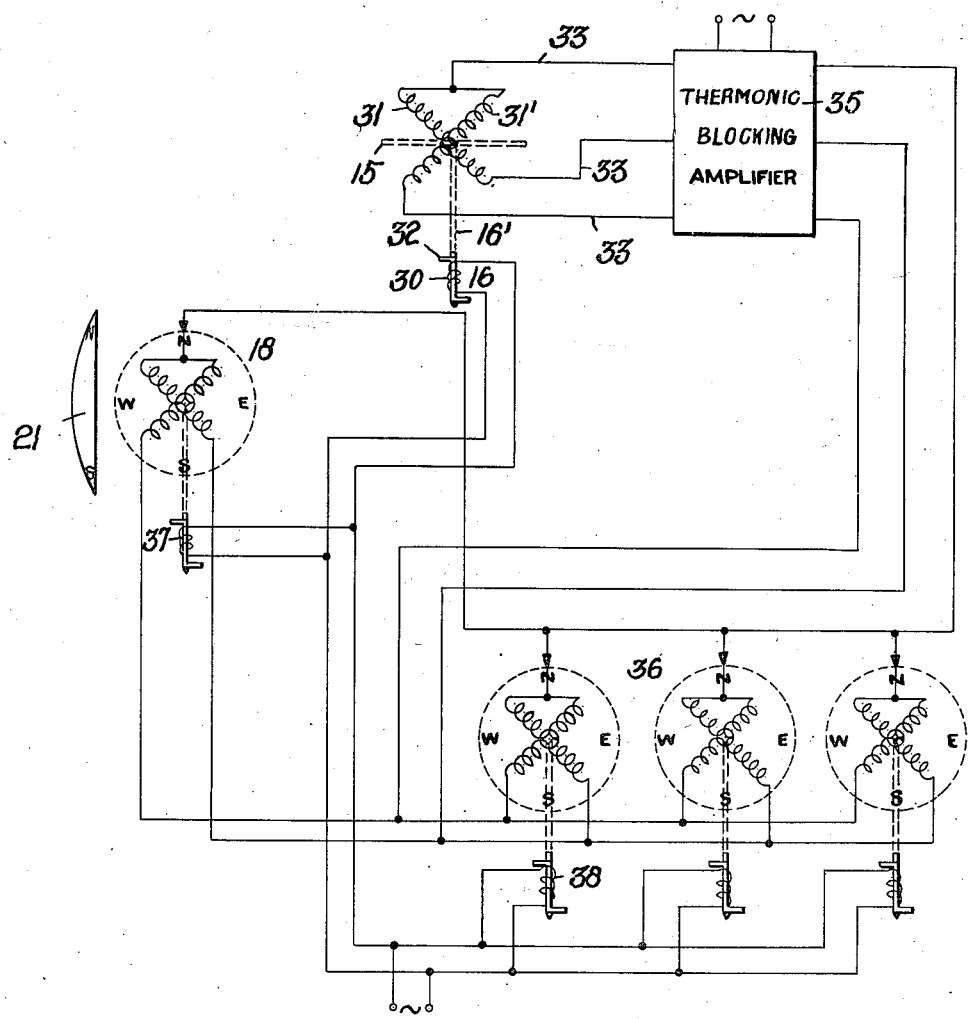

Patented July 13, 1943

2,323,897

UNITED STATES PATENT OFFICE 2,323,897

FLIGHT INDICATOR

Leslie F. Carter, Leonia, N. J., assignor to Sperry Gyroscope Company, Inc., Brooklyn, N. Y., a corporation of New York Application September 28, 1940, Serial No. 358,890

8 Claims. (Cl. 33—204)

This invention relates to complete or unitary attitude or flight indicators for aircraft which indicate on one face not only the attitude of the craft about both horizontal axes, but also its attitude or, more precisely, its heading or course in azimuth. The invention also relates to an improved form of remote reading stabilized magnetic compass, whereby the magnetic needle is maintained more precisely on the magnetic meridian by reason of its complete stabilization.

My invention further constitutes an improvement on the remote reading stabilized magnetic compass disclosed in the prior joint application of applicant and William Anscott, Serial No. 313,154, filed January 10, 1940.

Referring to the drawings showing one form my invention may assume,

Fig. 3 is a wiring diagram showing the transmission system from the stabilized magnetic compass to the vertical compass card on the same and also to remote repeater compasses.

Figure 1:
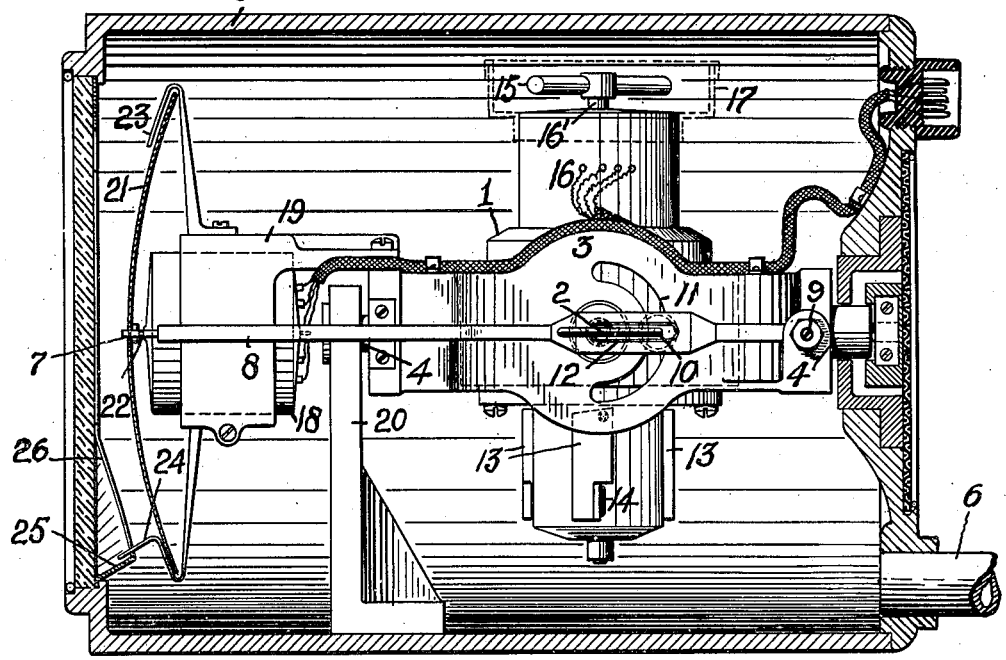
Fig. 1 is a vertical section through the casing of my improved course and attitude indicator.
Figure 2:
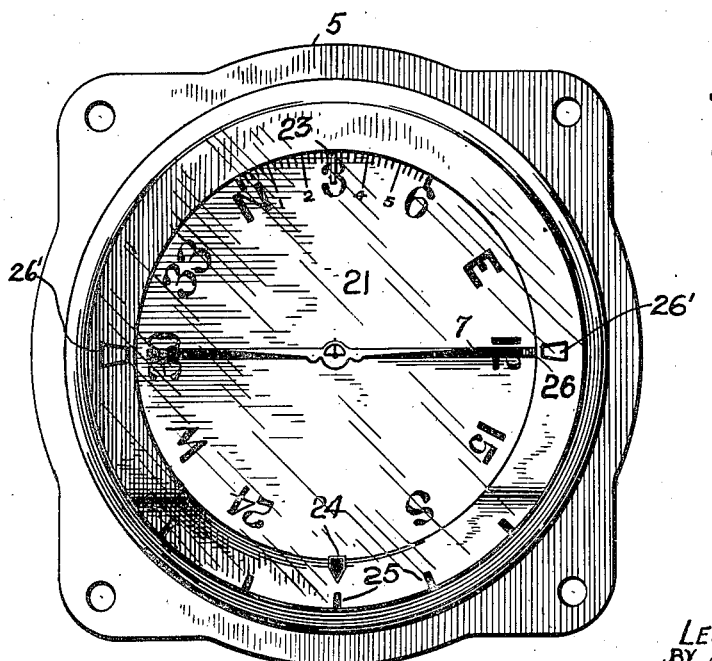
Fig. 2 is a face view of the same.

As will be seen from an inspection of Fig. 1, my invention can be readily applied to a standard form of gyro-vertical or artificial horizon, such, for instance, as shown in Patent No. 1,982,636, dated December 4, 1934, to Bert G. Carlson, for Gyro-verticals. Without going into detail, such gyroscopes are usually in the form of a single rotor spun by any suitable means, such as air under positive or negative pressure, and enclosed within a rotor casing 1 mounted for oscillation about a minor horizontal axis 2 in a gimbal ring 3, which in turn is pivoted for oscillation about a major fore and aft axis 4—4 within the closed casing 5, from which air is usually exhausted through port 6. The usual construction is to indicate both pitch and roll by a horizon bar 7 secured transversely on the forward end of a long lever 8 pivoted at its rear end 9 to ears on the gimbal 3 and readable on the usual reference markings 26' on bezel 26 fixed on the craft. The bar will hence tilt with the gimbal ring about the major or fore and aft axis 4—4. For imparting up and down movement to the bar, it is usual to provide a pin 10 on the rotor case projecting through an annular slot 11 in the gimbal and engaging a normally horizontal slot 12 in the bar 7, so that the bar is moved up and down as the aircraft pitches by the fact that the gyro case remains vertical while the instrument case 5 pitches with the craft. Erection of the gyroscope is usually maintained by pendulous shutters 13 cooperating with a plurality of air ports 14 in the bottom of the gyro casing 1.

As before stated, the present artificial horizon shows the attitude of the craft about both horizontal axes on one face. In order to show the course on this same face with minimum complications, I mount directly behind the face a small compass repeater motor 18, preferably of the self-synchronous type, placed with its armature axis horizontal and in line with the major axis 4—4 of the artificial horizon. Said motor is preferably supported by the gimbal 3 as by means of a bracket 19, which is shown as bolted to the top of the gimbal adjacent the forward trunnion 4, the bracket extending over the top of the supporting bracket 20 for the trunnion. The compass card 21 in the form of a circular disc is then secured directly to the motor shaft 22 and is shown as dished and as forming the background of the horizon indicator. The index 23 of the card is secured to the bracket 19 so that the readings of the compass are not affected by the rolling of the ship, since both the card and index roll together and the readings are only changed upon rotation of the card caused by the repeater motor. The compass card therefore will not interfere with the pitch indications of the bar 7. It is of course obvious that the positions of the card and index may be interchanged if desired. That is, the index may be made in the form of a rotatable pointer which reads on a card fixed on the bracket 19.

In order to indicate the amount of roll or bank, I have shown a second index or pointer 24 secured to the bottom of the bracket 19 and extending around underneath the card to read on a banking scale 25 on the bezel 26. The approximate bank is also shown by the tilt of the bar 7 with reference to the fixed indices 26'. Rotation of card 21 also shows the banking angle with reference to indices 26' when no relative turning is taking place between the card and the index 23.

The compass repeater is preferably controlled by a combined magnetic compass 15 and transmitter 16 mounted directly on and therefore stabilized by the gyro casing 1. The needle 15 is also preferably spaced from the gyro rotor in order to reduce the eddy current effect from the spinning rotor. In order to further reduce the effect, I may make the rotor of non-metallic or laminated material, or I may place a metallic shield in between the needle and the rotor. The case 1 itself may act partially as this shield and the metallic structure of the transmitter 16 (hereinafter described) also assists both as a shield and in spacing the needle from the rotor. In addition, I may place under the needle a cup-shaped shield 17 of metallic but non-magnetic material, such as aluminum or copper, to further eliminate eddy current effects. Preferably the magnets 15 constituting the compass are mounted directly on the shaft of the transmitter 16, the casing of which is mounted on the gyro casing. By mounting the needle on the shaft of the transmitter, its vertical axis is stabilized by the gyroscope and hence the needle may be carefully balanced and not affected by acceleration pressures. Also, no extra bearings need be employed for the needle.

Preferably the transmitter and repeater motor are of the type described more particularly in the aforesaid copending application, wherein very little magnetic material is employed in the construction of the same. As shown in Fig. 3, the transmitter 16 comprises an exciting winding 30 connected to an A. C. supply of suitable voltage and frequency and a pair of transmitting windings 31 and 31', the fields of the transmitting windings being disposed at right angles to one another and to that of the exciting winding. Winding 30 is magnetically coupled with windings 31 and 31' by means of a Z shaped inductor 32 mounted on shaft 16' which carries magnetic needle 15. The angular position of the horizontal limbs of inductor 32, which are in a fixed relationship to needle 15, determines the relative distribution of flux between coils 31 and 31' and hence the relative voltages induced in these coils. The direction of the resultant field of the two transmitting windings therefore rotates with rotation of needle 15 and shaft 16' in the same manner as in other types of self-synchronous transmitters. Windings 30, 31 and 31' are on the stator of transmitter 16. Inductor 32, which is the rotor of the device, carries no winding and is free to rotate without the drag of sliding contacts. The movement of needle 15 is therefore retarded only by the very slight friction in the special anti-friction bearings in which shaft 16' is pivoted.

The windings 31 and 31' are connected in a manner similar to that of the stator windings of a two-phase motor to a vacuum tube amplifier 35, the output of which is connected to the several windings of repeater motor 18 and any other repeater motors 36 that may be secured in the aircraft. The single phase excitation current is shown as connected directly not only to inductor winding 30 of the transmitter, but also to the similar inductor windings 37 and 38 of the several repeaters. Erroneous readings due to coercion of the transmitter by the receiver are preferably prevented by the use of blocking tubes in the amplifier 35, as described in the aforesaid application.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a flight indicator for aircraft having a normally vertical window, a gimbal ring mounted gyro-vertical behind said window, a horizon indicator controlled by said gyro-vertical and visible through said window to indicate roll and pitch of the craft, a normally vertical substantially flat compass card mounted behind said indicator and also visible through said window, thereby forming a background for said indicator, an electric repeater motor for turning said card, an electric transmitter mounted on said gyro-vertical for actuating said repeater motor, and a magnetic compass needle on the shaft of said transmitter whereby said needle is stabilized by said gyro-vertical.

2. A flight indicator for aircraft as claimed in claim 1, wherein said repeater motor and compass card are mounted on said gimbal ring mounting.

3. A flight indicator for aircraft comprising a vertically spaced universally gimbal mounted gyro-vertical and magnetic compass, said compass being mounted on said gyro-vertical to stabilize the compass about both horizontal axes, a vertical reading substantially flat compass card separate from said magnetic compass and journaled on said gyro-vertical, a horizon indicator connected to said gyro-vertical and mounted in front of said card, a window through which said card and indicator are visible one behind the other, an electric transmitter connected to said magnetic compass to transmit the readings thereof to a distance, and a repeater motor mounted on said gyro-vertical and actuated from said transmitter for turning said card.

4. A flight indicator for aircraft as claimed in claim 3, wherein said transmitter and repeater motor are of the A. C. self-synchronous type, and including means for preventing reaction from the repeater from placing a substantial load upon the transmitter.

5. A flight indicator for aircraft comprising a gyro-vertical mounted on a gimbal ring with its horizontal axes of rotation parallel respectively to the longitudinal and transverse axes of said craft, a normally vertical window mounted in front of said gyro-vertical perpendicular to said longitudinal axis, a substantially flat card mounted vertically and parallel to said window between said window and said gyro-vertical and arranged to be seen through said window, a horizon bar placed between said window and said card and actuated by said gyro-vertical to indicate roll and pitch of said craft by its position relative to said window, an electric transmitter mounted on and spaced vertically from said gyro-vertical with its axis and shaft vertical, a magnetic needle supported on and actuating said shaft, said needle being substantially spaced from the rotor of said gyro-vertical and being shielded therefrom by an eddy current field, an electric repeater motor controlled by said transmitter and mounted on said gimbal ring to rotate said card about said longitudinal gimbal axis, and an index mounted on the frame of said receiver, whereby said card indicates compass bearings by rotation with respect to said index which are simultaneously visible with attitude indications given by the positioning of said horizon bar with respect to said window.

6. A flight indicator for aircraft comprising a gyro vertical, a magnetic compass mounted thereon to be stabilized thereby, a normally vertical and disc-shaped compass card spaced from and in front of said gyro vertical and compass, an index for said card, a horizon indicator positioned in front of said card, means for stabilizing said card, said index and said indicator from said gyro vertical against rolling, another index fixed to the craft, means for moving said indicator up and down by said gyro vertical to indicate pitch of said craft by its up and down movements relative to said card and indices, and means for rotating said card from said compass in a normally vertical plane to indicate by reference to said first index the magnetic heading of said craft, and whereby rotation of said card and indicator relative to said second index shows roll of the craft.

7. A flight indicator for aircraft comprising a gyro vertical having a universal gimbal ring mounted with its major axis fore and aft, a magnetic compass, means for mounting said compass on said gyro vertical to be universally stabilized thereby, a normally vertical substantially flat compass card, an index for said card, said card and index being mounted on said ring to be stabilized by said gyro vertical against rolling, a second fixed index and means for rotating said card from said compass about a normally horizontal axis on said ring to indicate by reference to said first index the magnetic heading of said craft, roll of the craft being indicated by rotation of said card and first index with reference to said second index.

8. A flight indicator for aircraft as claimed in claim 7, in which said means for rotating said card from the compass comprises an electric transmitter also mounted on said gyro vertical and directly connected to said compass to be turned thereby, and a repeater motor mounted on said gimbal ring and directly connected to said compass card.

LESLIE F. CARTER.